Dec. 10, 1929.  J. W. JELKS  1,739,395
SCREEN FOR AUTOMOBILES
Filed Sept. 23, 1927
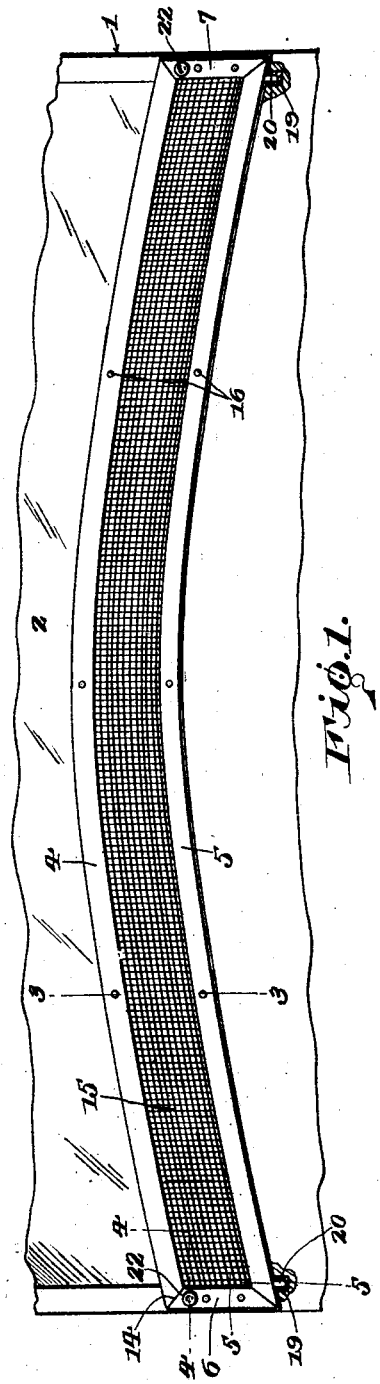
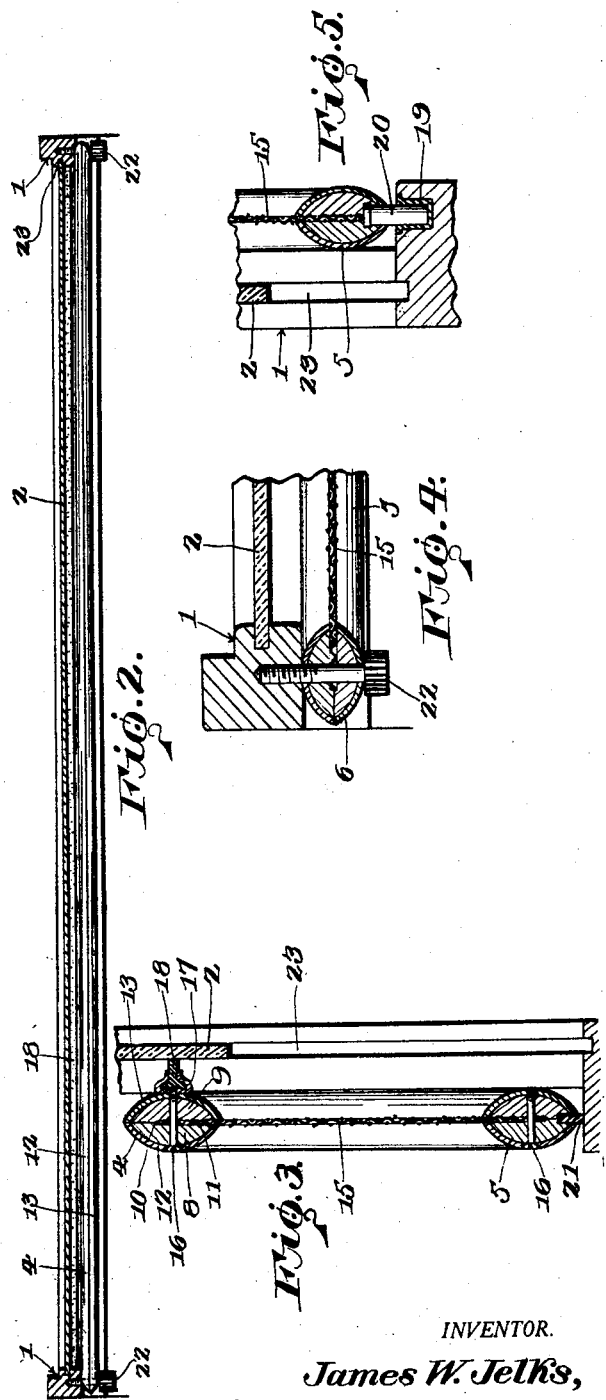
INVENTOR.
James W. Jelks,
BY
Geo. P. Kimmel
ATTORNEY.

Patented Dec. 10, 1929

1,739,395

UNITED STATES PATENT OFFICE

JAMES W. JELKS, OF MIAMI, FLORIDA

SCREEN FOR AUTOMOBILES

Application filed September 23, 1927. Serial No. 221,528.

This invention relates to a screen attachment for windshields of motor vehicles, and has for its object to provide, in a manner as hereinafter set forth, an attachment of such class to protect drivers, when the windshield glass is raised for ventilation or for entrance of air, from bees, bugs or other insects, as well as gravel or foreign bodies whereby the possibility of accidents is reduced to a minimum.

Further objects of the invention are to provide, in a manner as hereinafter set forth, a screen attachment for the purpose referred to which is simple in its construction and arrangement, strong, durable, compact, thoroughly efficient in its use, conveniently installed, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a front elevation of a screen attachment, in accordance with this invention, and showing the adaptation thereof with a windshield of the vertical adjustable type.

Figure 2 is a longitudinal sectional view of the windshield showing the adaptation therewith of a screen attachment in accordance with this invention.

Figure 3 is a section on line 3—3 Figure 1.

Figure 4 is a section on line 4—4 Figure 1.

Figure 5 is a section on line 5—5 Figure 1.

Referring to the drawings in detail 1 denotes the frame of the windshield and 2 the vertically movable transparent panel or glass thereof. The screen attachment is arranged forwardly with respect to the frame 1, and is secured against the lower portion of such frame and abuts against the cowl 3 of the vehicle. The width of the attachment can be as desired and its contour will conform to that of the cowl 3. The attachment extends from one side to the other side of the frame 1.

As shown the attachment is of arcuate contour and comprises a frame consisting of a top member 4, a bottom member 5 and a pair of end members 6, 7. The members 4, 5 are of arcuate form and are arranged in spaced relation by the members 6, 7 which are vertically disposed and are of appropriate height. Each of the frame members can be of any suitable cross sectional contour, but as shown are elliptical in cross section. Each frame member comprises a wooden core formed of a pair of sections 8, 9 and each of which is rabbeted on its inner face as at 10. The rabbets of the sections 8, 9 are oppositely disposed and provide when the sections 8, 9 are in abutting relation a pocket 11 which opens at the inner side of the frame member. The sections 8, 9 are enclosed by a metallic covering formed of two oppositely extending sections 12, 13 which abut at the outer side edges and have their inner side edges spaced from each other to form continuations of the side walls of the pocket 11. The ends of the frame members are beveled as at 14 to provide for said ends to abut each other when the frame is set up. Extending completely across the opening formed by the frame is a foraminous panel 15 which extends into the pockets 11 formed by the sections 8, 9 of the frame members. The cover sections, core sections and panel 15 are secured together by spaced holdfast devices 16 which are countersunk in the outer cover sections, extend through the core sections and panel 15 and have threaded engagement with the inner cover sections.

Secured to the outer face of the inner cover section of the frame member 4 and of a length to extend along the longitudinal median of said outer face, from the inner edge of one side of the frame 1 to the inner edge of the other side of said frame 1, is a combined coupling and holder member 17 which carries a resilient sealing strip 18 to abut the forward face of the glass 2 to prevent the passage of bees, bugs, insects or foreign bodies between the frame member 4 and the panel 2.

The cowl 3 has seated therein a pair of spaced sockets forming members 19 into which extend coupling pins 20 which are secured to and depend from ends of the frame member 5. Secured to and depending from the frame member 5, as well as extending lengthwise thereof, is a resilient sealing strip 21 which engages the upper face of the cowl 3. The pins 20 are arranged at the ends of the strip 21. The sealing strip 21 depends from the frame member 5 in the same plane as the foraminous panel 15, but at right angles to the sealing strip 18. The frame members 6 and 7 are connected to the sides of the windshield frame 1, by headed holding screws 22 which extend through said frame members 6, 7 and have threaded engagement with the windshield frame. The holding screws 22 provide means for tightly clamping the sealing strip 18 against the glass 2. The foraminous panel 15, when the attachment is positioned, will be arranged forwardly of the opening 23, formed when the panel 2 is elevated and the foraminous panel 15 will permit of entrance of air, but arrest the passage of bugs, bees, insects or other foreign bodies through the opening formed when the panel or glass 2 is elevated.

It is thought the many advantages of a screen attachment for windshields, in accordance with this invention can be readily understood, and although the preferred embodiment of the invention is as illustrated and described, yet it is to be understood that changes in the details of construction can be had which will fall within the scope of the invention as claimed.

What I claim is:

A screen attachment for windshields of motor vehicles comprising a frame for connection to the sides of the windshield at the lower portion thereof, coupling pins depending from the bottom of said frame at each end thereof for seating in the cowl of the vehicle, a foraminous panel secured within the frame for screening the opening formed when the windshield glass is elevated, a combined coupling and holding member secured to and projecting rearwardly from the top of the frame, a resilient sealing strip carried by said member for permanent contact with the windshield glass, and a resilient sealing strip depending from the bottom of the frame and positioned between said pins for permanent contact with the cowl of the vehicle.

In testimony whereof, I affix my signature hereto.

JAMES W. JELKS.